United States Patent
Saito et al.

[11] Patent Number: 5,941,336
[45] Date of Patent: Aug. 24, 1999

[54] VEHICLE COLLISION SENSOR MOUNTING DEVICE

[75] Inventors: Seiichi Saito; Hideto Hirahara; Mamoru Iiyama; Kaoru Umezawa; Kazuo Koyanagi; Kazushi Ozaki, all of Kanagawa, Japan

[73] Assignee: Isuzu Motors Limited, Tokyo, Japan

[21] Appl. No.: 08/885,847

[22] Filed: Jun. 30, 1997

[30] Foreign Application Priority Data

Jun. 30, 1996 [JP] Japan ................................. 8-188855

[51] Int. Cl.⁶ ................................................ B60K 28/10
[52] U.S. Cl. ........................ 180/274; 180/282; 296/194; 280/735; 200/61.44; 200/61.45 R
[58] Field of Search ................................ 280/735, 728.2, 280/728.1, 727, 781; 200/61.44, 61.45 R; 180/274, 282; 296/194

[56] References Cited

U.S. PATENT DOCUMENTS

| | | | |
|---|---|---|---|
| 5,281,780 | 1/1994 | Holand | 180/274 X |
| 5,311,963 | 5/1994 | Shigeoka et al. | 180/274 |
| 5,364,158 | 11/1994 | Watanabe et al. | 296/189 |
| 5,411,289 | 5/1995 | Smith et al. | 280/735 |
| 5,566,974 | 10/1996 | Mazur et al. | 280/730.2 |
| 5,623,246 | 4/1997 | Kruse et al. | 180/274 X |

FOREIGN PATENT DOCUMENTS 44 09 324   10/1994   Germany ................................ 180/274

Primary Examiner—Christopher P. Ellis
Attorney, Agent, or Firm—Sughrue, Mion, Zinn, Macpeak & Seas, PLLC

[57] ABSTRACT

A collision sensor 1 is mounted on a pedal bracket 2 which are supported by a front frame 4, a front mount rail 5, and a reinforce 8 which are all located in front of the cab. The collision sensor 1 is connected through a cable 24 to the gas generator 21 of a pretensioner seat belt 16 and to the inflator 23 of an air bag 17. The pedal bracket 2, being high in rigidity, senses a shock wave well, and is scarcely damaged at the time of a collision. Since it is not exposed directly in the air, it is high in weather resistance, and is proper in maintenance because it is located at the position to which the hand can be readily extended. Thus, at the time of a collision, the degree of injury to the passenger is minimized.

3 Claims, 2 Drawing Sheets

VEHICLE COLLISION SENSOR MOUNTING DEVICE

BACKGROUND OF THE INVENTION

1. Field of the Invention

This invention relates to a vehicle collision sensor mounting device, and more particularly to a device for mounting a vehicle collision sensor which, at the time of a collision, applies a signal to an air bag and a pretensioner seat belt.

2. Related Art

A passenger restricting device such as an air bag and a pretensioner seat belt which, at the time of a collision, protects a passenger, needs a sensor and a decision circuit which detects the occurrence of a collision and applies a detection signal to the device. A variety of collision sensors are available—a coil spring type collision sensor, a role spring type collision sensor, a cylinder ball type collision sensor, and a semiconductor type collision sensor. Most of them have a decision circuit which determines whether or not it is a collision, a signal generating circuit, and an shock force detecting circuit as one unit.

In the case of a forward control (cab-over type) truck, the driving position is raised, so that the driver's head or chest is liable to hit the steering wheel. And the position of the steering wheel is liable to change more than in the case of an automobile. In addition, it, unlike an automobile, has no intermediate member such as a hood (bonnet), so that the shock is directly applied to the passenger. Furthermore, because of the state of installation of the steering wheel, it is difficult for the truck to have a full-bag type air bag.

Hence, in the case of the truck, although its main restraint system for the passenger is a pretensioner seat belt, it is necessary to install an air bag at a suitable part of the steering wheel as supplemental restraint system (SRS); that is, both the main and SRS are utilized for the protection of the passenger. In the prior art, a collision sensor for transmitting a detection signal to the air bag or pretensioner seat belt has been employed; however, it involves various problems which must be solved.

It is essential for the collision sensor to generate a signal immediately when a collision occurs. When the automobile is traveling on an uneven road, the collision sensor is greatly vibrated; however, the collision sensor should not determine the occurrence of a collision from it. In addition, it is also essential that its mounting section is hardly broken. Furthermore, the collision sensor should be high both in weather resistance and in water resistance. In addition, the maintenance, inspection, and replacement of the collision sensor should be simple. Moreover, the collision sensor can be installed with ease. In order to determine the position of the collision sensor which satisfies the above-described various requirements, the present inventor has installed the collision sensor at various parts of the vehicle, and measured the time required for the generation of an ignition signal for an inflator such as an air bag (hereinafter referred to as "TTF (Time to Fire)", when applicable). The results of measurement are as indicated in Table 1.

Table 1 indicates TTFs of the collision sensor at various positions compared with the TTF as a reference value, 1.00, which has been measured in the case where the collision sensor is installed on the pedal bracket. As shown in Table 1, where the collision sensor is installed at the front part of the engine hood under the seat, the center of the engine hood, and at the cab side sill, the ignition time is about 10 to 30% delayed. In the case where the collision sensor is installed at the steering shaft, the ignition time is delayed twice. On the other hand, when it is installed on the chassis frame, the ignition time occurs about 10% expedited. Heretofore, in many cases, the collision sensor is installed on the engine hood; however, this results in the following difficulty: Since the engine hood is low in rigidity, the time which elapses from the time instant that a collision occurs until the inflator operates is long, so that it is impossible to sufficiently restrict and protect the passenger. Of course, it is impossible to install the collision sensor on the steering shaft. On the other hand, in the case where the collision sensor is installed on the chassis frame, preferably the TTF is short. However, in this case, the collision sensor is exposed outside the vehicle body, and therefore it is low both in weather resistance and in water resistance. Thus, it has been found that the collision sensor should be installed on the pedal bracket.

On the other hand, a collision sensor has been disclosed by Japanese Patent Application (OPI) No. 330399/1993 (the term "OPI" as used herein means an "unexamined published application"). In the prior art, the collision sensor is mounted on the side panel (6) through an elastic rubber member (36). This is to damp the shock force, thereby to accurately output a collision detection signal at all times. However, the collision sensor mounting structure is disadvantageous in that the TTF is long.

In view of the foregoing, an object of the invention is to provide a vehicle collision sensor mounting device with which the TTF is short, and at the occurrence of a collision the passenger can be positively protected, and which is high in weather resistance and excellent in maintenance. On the other hand, the problem that the collision sensor generates an erroneous signal in response to an shock force which is not of a collision can be sufficiently eliminated by changing the circuit in the sensor or by the improvement of the decision criteria. The water resistance can be improved by the provision of a water-proof cover.

SUMMARY OF THE INVENTION

The foregoing object of the invention has been achieved by the provision of a device for mounting a collision sensor which is provided on a vehicle which comprises: a front frame which is provided at the middle of the front of the cab of the vehicle in the direction of vehicle width, forming the frame of the cab; a front mount rail which is provided in the lower portion of the front of the cab in the direction of vehicle width, forming the frame of the cab; a reinforce which is coupled to the front frame and secured to the cab, positively supporting an instrument panel; and a pedal bracket which is supported by the front frame, the front mount rail, and the reinforce, to support a brake pedal and a clutch pedal, the collision sensor applying a signal to an air bag and pretensioner seat belt when a collision occurs with the vehicle, in which, according to the invention, the collision sensor is secured to the pedal bracket, and coupled through a coupling member to an inflator adapted to operate the air bag and the pretensioner seat belt.

More specifically, in the device, the pedal bracket comprises: a head section having a supporting surface adapted to supporting steering cowl; an upper front arm section which is extended upwardly from the head section and secured to the front frame; an upper rear arm section which is also extended upwardly from the head section on the side of the supporting surface, and secured to the reinforce; and a foot section which is extended downwardly from the head section, and secured to the front mount rail, the foot section including a flat-plate-shaped surface section, and a flange section surrounding the surface section, and the collision sensor is fixedly secured to the surface section.

The collision sensor is directly secured to the pedal bracket. Therefore, the TTF is short, the ignition of the inflator is not delayed; that is, when a collision occurs with the vehicle, the passenger is positively restricted and protected. The passenger is protected with the air bag and the pretensioner seat belt, and therefore he is secured from a injury. The sensor mounting portion of the pedal bracket is high in rigidity, and therefore it is not broken at the time of a collision; that is, the device is free from the delay in response which is due to the breakage of the sensor mounting portion of the pedal bracket. Furthermore, if the circuit in the collision sensor is improved, or if the sensor is covered with a water-proof cover, then the erroneous operation of the sensor can be prevented, and the sensor is improved in weather resistance and in water resistance.

BRIEF DESCRIPTION OF THE DRAWING(S)

DETAILED DESCRIPTION OF THE PREFERRED EMBODIMENTS

Figure 1:
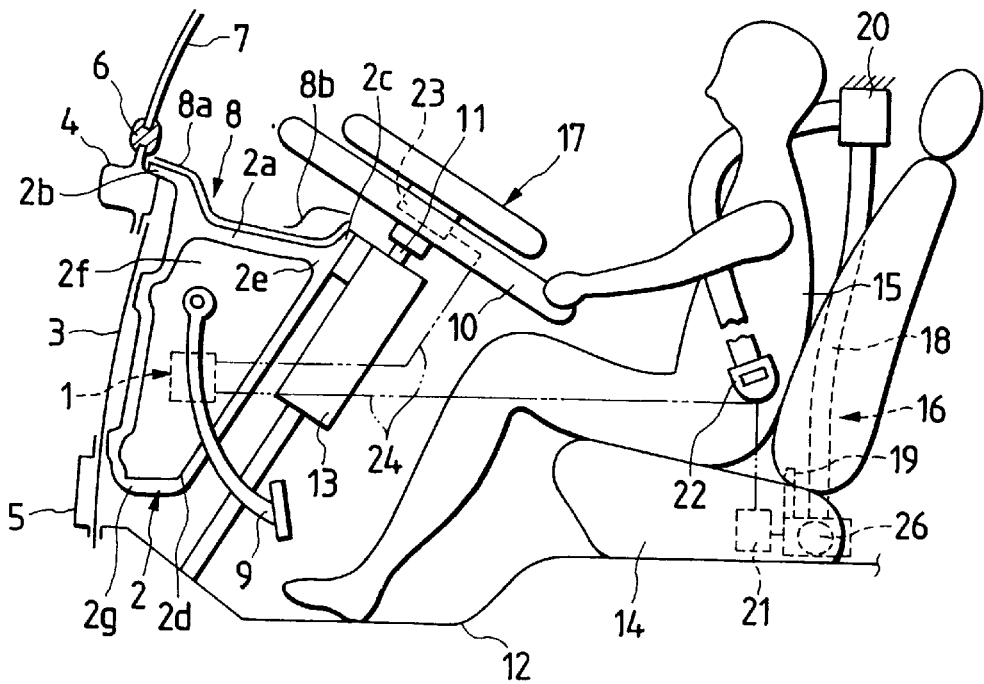
FIG. 1 is a side view for a description of the structures of a vehicle collision sensor mounting device according to the invention, and of its relevant components.

A vehicle collision sensor mounting device, which constitutes an embodiment of the invention, will be described with reference to the accompanying drawings.

First, a vehicle structure around a pedal bracket 2 on which a collision sensor 1 is mounted, will be described with reference to FIG. 1. A front frame 4 is fixedly provided on the central portion of the front of a cab which is above a front panel 3, in such a manner that it is extended in the direction of vehicle width. And a front mount rail 5 is fixedly provided on the lower portion of the front of the cab which is below the front panel 3, in such a manner that it is also extended in the direction of vehicle width. The front frame 4 and the front mount rail 5 form the frame of the cab. A front glass plate 7 is engaged through a seal member 6 with the upper portion of the front frame 4. An instrument panel (not shown) is fixedly coupled to the front frame 4. The instrument panel is positively supported by a reinforce 8. The reinforce 8 is in the form of a frame which is made up of a front panel 8a, a rear panel 8b, and an intermediate panel (not shown) set between those panels 8a and 8b.

The pedal bracket 2 is supported by the front frame 4, the front mount rail 5, and the reinforce 8, in such a manner that the pedal bracket 2 is fixedly coupled to the front frame 4, the front mount rail 5 and the reinforce 8 (described later in detail). The pedal bracket 2 supports a pedal 9.

A steering shaft 11 coupled to a steering wheel 10 is extended through a floor panel 12 and coupled to a steering mechanism (not shown). The steering shaft 11 is surrounded by a steering cowl 13, which is secured through a steering bracket (not shown) to the side of the pedal bracket 2.

A seat 14 is fixedly mounted on the floor panel 12, and a passenger (driver) is set on the seat 14, to operate the steering wheel and the pedal 9.

Figure 2:
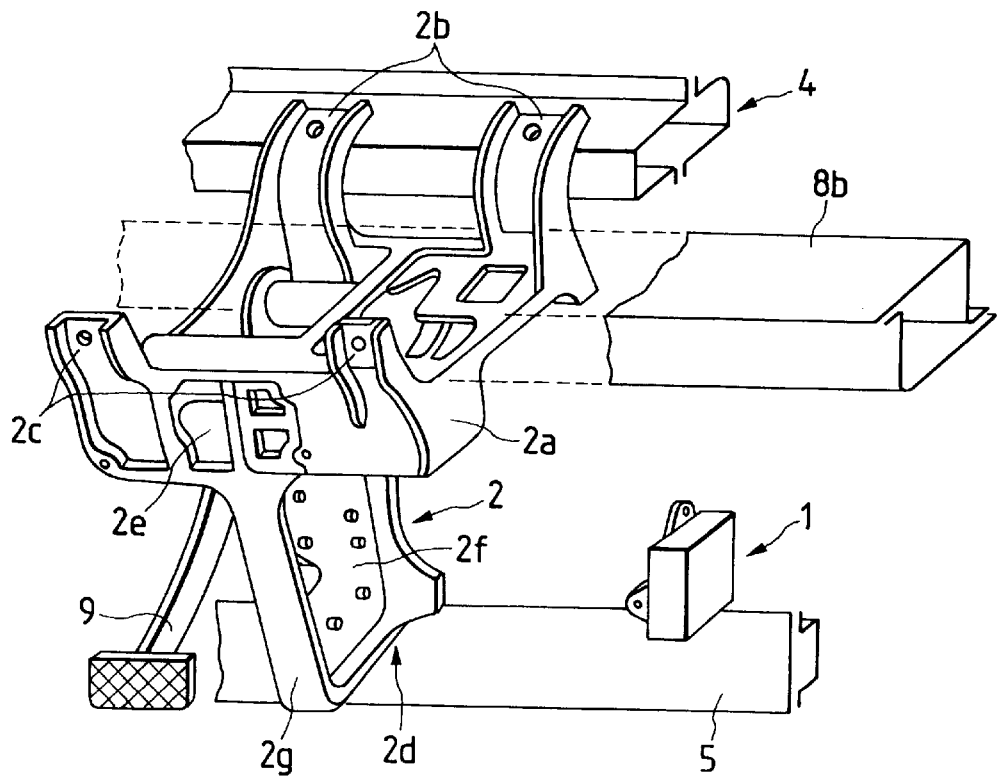
FIG. 2 is a perspective view showing a pedal bracket in the device of the invention in detail.

Now, the structure of the pedal bracket 2 will be described with reference to FIG. 2 in more detail.

Roughly stated, the pedal bracket 2 is made up of a head section 2a, an upper front arm section 2b, an upper rear arm section 2c, and a foot section 2d. The head section 2a is in the form of a block, and has a supporting surface 2e on the rear side which supports steering cowl 13. The upper front arm section 2b is made up of members which extend upwardly from the head section 2, and is fixedly coupled to the front frame 4 together with a front panel 8a (not shown). The upper rear arm section 2c is also made up of members which extend upwardly from the head section 2, which is fixedly coupled to the rear panel 8b of the reinforce 8. The foot section 2d is extended downwardly from the head section 2a, and it is secured to the front panel 3 and the front mount rail 5 as shown in FIGS. 1 and 2.

The foot section 2d is made up of a flat-plate-shaped surface section 2f and a flange section 2g which surrounds the surface section 2f to increase the rigidity of the foot section 2d. The collision sensor 1, which is an essential element of the invention, is detachably mounted on the surface section 2f. Since the collision sensor 1 is mounted on the surface section 2f, it is surrounded by the flange section 2g; that is, it is protected by the flange 2g.

As shown in FIG. 1, in order to protect the passenger 15 at the time of a collision, a pretensioner seat belt 16 for restricting the forward and backward movement of the passenger 15, and an air bag 17 for protecting the face and the neck of the passenger 15 are provided. In the case of an automobile, sometimes an air bag is provided between the chest (or breast) of the passenger and the steering wheel to restrict the movement of the upper half of the passenger. On the other hand, the invention is for a forward control truck. Hence, in the invention, the pretensioner seat belt 16 and the air bag 17 are employed in combination, to protect the passenger (driver) 15.

As shown in FIG. 1, the pretensioner seat belt 16 comprises: a belt 18 which is wound on the body of the passenger 15; a winding section 26 fixedly set below the seat 14 to restrict the movement of the belt 18 at the time of a collision; and a holder 20 secured to the stationary side of the vehicle body to support the middle of the belt 18. And its drive section 29 includes a gas generator 21. The belt 18 has a fixing member 22 at the end which is detachably coupled to the stationary side of the vehicle body. On the other hand, the air bag 17 is provided on the steering wheel 10, and is coupled to the inflator 23. The collision sensor 1 is coupled to the gas generator 21 and the inflator 23 through a cable 24 which is one of the coupling members.

Figure 3:
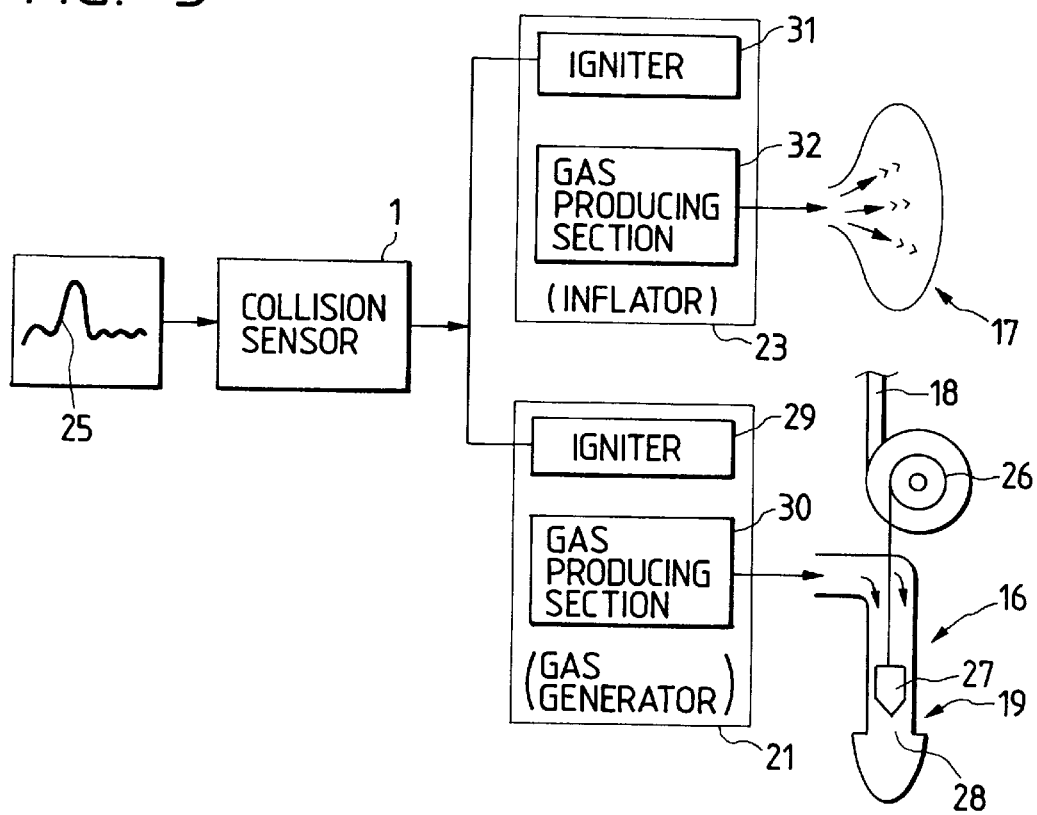
FIG. 3 is an explanatory diagram, partly as a block diagram, for a description of passenger protecting means using a collision sensor in the device of the invention.

A variety of conventional collision sensors such as a coil spring type collisions sensor, a roll spring type collisions sensor, a cylinder ball type collisions sensor, and a semiconductor type collisions sensor, are applicable. However, in the invention, the collision sensor is of the type that, as shown in FIG. 3, it receives an shock wave 25 produced by a collision, to transmit an ignition signal (current) to the gas generator 21 and the inflator 23. As was described above, the collision sensor 1 is fixedly mounted on the surface section 2$f$ high in rigidity of the pedal bracket 2. The pedal bracket 2 is not directly exposed to the outside, but it is located where the collision sensor can be installed relatively readily. Therefore, the maintenance and replacement of the collision sensor 1 can be achieved with ease. The collision sensor 1 thus installed is free from the problem of weather resistance, when compared with a collision sensor installed on the chassis frame. However, it may be wetted with water, and therefore it is preferable to cover it with a water-proof cover as the case may be.

As shown in FIG. 3, the pretensioner seat belt 16 comprises: the winding section 26 for winding the belt 18; a drive section 19 including a piston 27 coupled to the belt 18, and a cylinder 28; and the gas generator 21 to supply gas to the cylinder 28. The gas generator 21 comprises: an igniter 29 which is ignited by the ignition signal generated by the collision sensor 1; and the gas producing section 30 which produces gas with the aid of the fire of the igniter 29, as is well known in the art. The gas pressure from the gas producing section 30 operates the piston 27, to instantaneously wind the belt to restrict the movement of the passenger 15.

On the other hand, the inflator 23 of the air bag 17 has an igniter 31, and a gas producing section 32. In response to the ignition signal from the collision sensor 1, the igniter 31 is ignited, while the output gas of the gas producing section 32 is supplied into the air bag 17, to inflate the latter 17.

Now, specific features of the vehicle collision sensor mounting device according to the invention will be described.

The collision sensor mounting device should satisfy at least the following conditions: That is, (1) it is able to sense the shock wave 25 (FIG. 3) with high accuracy (hereinafter referred to as "a first condition", when applicable), and (2) it will not mistake the vibration for a collision signal which occurs with the vehicle when the latter is traveling on an uneven road (hereinafter referred to as "a second condition", when applicable), and (3) the collision sensor should be installed where it is scarcely broken by a collision (hereinafter referred to as "a third condition", when applicable), and (4) it is high in weather resistance and water resistance (hereinafter referred to as "a fourth condition", when applicable).

Figure 4:
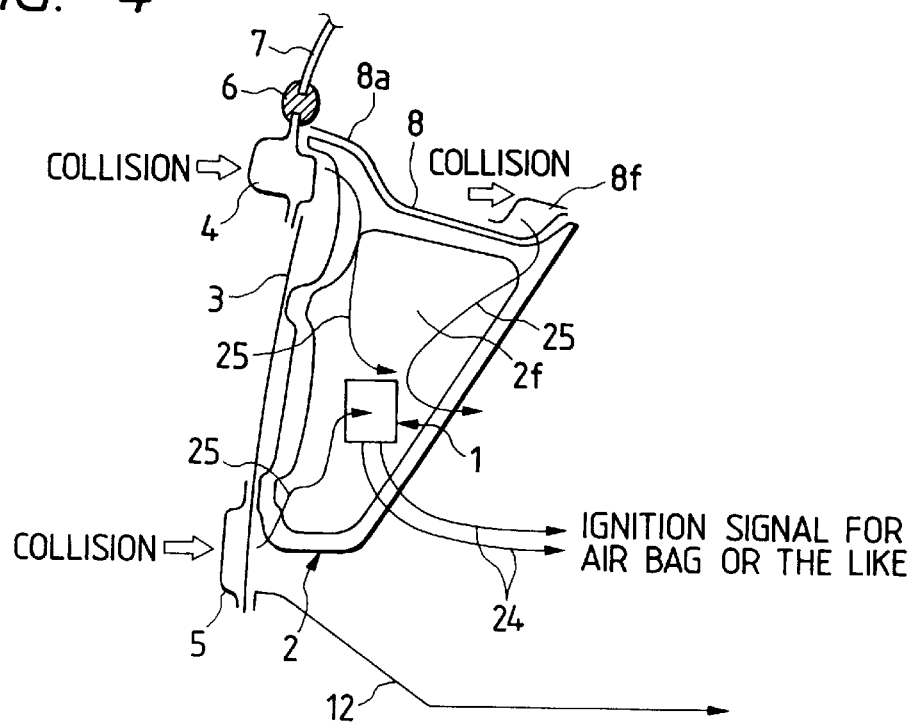
FIG. 4 is an explanatory diagram for a description of the path of transmission of a shock wave in the device of the invention.

First, the first condition and the collision sensor 1 will be described. As shown in FIG. 4, the shock wave 25 formed by a collision is transmitted through the front frame 4 provided in front of the cab, the front panel 8$a$ of the reinforce 8, and the front mount rail 5 to the pedal bracket 2, and through the rear panel 8$b$ of the reinforce 8 to the pedal bracket 2. The pedal bracket is high in rigidity. Therefore, the shock wave 25 transmitted to the pedal bracket 2 is directly and sensitively transmitted to the collision sensor 1 without delay which is secured to the surface section 2$f$. Thus, the first condition is satisfied.

The second condition concerns the internal structure of the collision sensor, and therefore its detailed description will be omitted. If the collision sensor 1 is so designed that it is excessively sensitive, then it may detect a shock wave which is produced when the vehicle is traveling on an uneven road, or when it slightly collides with a thing; that is, when a slight collision occurs with the vehicle. However, it is not difficult to design both the internal structure and the decision criteria of the sensor so that they work instantaneously with a shock wave which is higher than a determined value. In the invention, the collision sensor which satisfies the second condition, is employed.

The collision sensor mounting device meets the third condition as follows: As was described before, the pedal bracket 2 is high in rigidity, and therefore it will not be broken first at the time of a collision. Furthermore, since the first condition is satisfied thereby, even if the pedal bracket 2 is broken, the collision sensor 1 outputs the ignition signal earlier than the breakage of the pedal bracket.

With respect to the fourth condition, the weather resistance of the collision sensor is acceptable as was described above; however, the collision sensor may be wetted by water for instance when the vehicle is washed. Hence, it is preferable to cover the collision sensor with a water-proof cover. However, in practice, it is unnecessary to do so because the collision sensor itself is water-proof.

As was described above, the collision sensor mounting device of the invention satisfies the first through fourth conditions, and it is not surrounded by the instrument panel nor the central console. Therefore, the maintenance, inspection, and replacement of the collision sensor can be achieved with ease, and furthermore the degree of freedom in the position of installation is high. Thus, it can be relatively readily achieved to install the collision sensor 1 at the best position, and to confirm its effects.

Table 2

Table 2 indicates reducing effects of degree-of-injury by the pretensioner seat belt 16 and the air bag 17 with the collision sensor mounting device of the invention.

In Table 2, the effects are indicated with the effect in the original case as 1.0. As is seen from Table 2, the effect is significant with both the head and the chest; however, the effects is more significant with the head.

Effect(s) of the Invention (1) With the vehicle collision sensor mounting device of the present invention, the collision sensor is mounted on the pedal bracket which is high in rigidity, and to which the shock wave is directly transmitted. Hence, at the time of a collision, the ignition signal is quickly applied to the pretensioner seat belt and the air bag, to protect the passenger from injury, or minimize the degree of injury of the passenger. Furthermore, with the device, the collision sensor is simple in maintenance, and high in the degree of freedom in the position of installation. In addition, the collision sensor is high in weather resistance, and has no problem with water resistance.

(2) With the vehicle collision sensor mounting device the present invention, the collision sensor is fixedly mounted on the surface section of the pedal bracket which is relatively large in area and convenient in installation. Therefore, the collision sensor outputs the ignition signal with high accuracy, and it is improved in maintenance when compared with the conventional one. The surface section is surrounded by the flange section, and therefore it is high in mechanical strength, thus being protected from damage at the time of a collision. In addition, the position of the collision sensor can be readily changed.

TABLE 1

| SENSOR MOUNTING POSITION | T · T · F (TIME TO FIRE) |
| --- | --- |
| PEDAL BRACKET | 1.0 |
| FRONT PART OF ENGINE HOOD | 1.1 |
| CENTER PAET OF ENGINE HOOD | 1.3 |
| CAB SIDE SILL | 1.2 |
| STEERING SHAFT | 2.0 |
| CHASSIS FRAME | 0.9 |

RATIO OF RESPONSE TIME OF COLLISION SENSOR AT VARIOUS POSITIONS WITH.
RESPONSE TIME OF COLLISION SENSOR INSTALLED IN PEDAL BRACKET IN 1.0.

TABLE 2

|  | ORIGINAL | AFTER IMPROVEMENT |
| --- | --- | --- |
| HIG | 1.0 | 0.5 |
| CHEST G | 1.0 | 0.9 |

(RATIO. ORIGINAL CASE CONSIDERED AS 1.0)

What is claimed is:

1. A device for mounting a collision sensor to a vehicle comprising:

a front frame provided at the middle of the front of the cab of said vehicle in the direction of vehicle width, forming the frame of said cab;

a front mount rail provided in the lower portion of the front of said cab in the direction of vehicle width, forming the frame of said cab;

a reinforce coupled to said front frame and secured to said cab, positively supporting an instrument panel; and a pedal bracket supported by said front frame, said front mount rail, and said reinforce, to support a brake pedal and a clutch pedal; and said collision sensor applying a signal to an air bag and a pretensioner seat belt when a collision occurs with said vehicle, said collision sensor secured to said pedal bracket, and coupled through a coupling member to an inflator adapted to operate said air bag and said pretensioner seat belt.

2. A device as claimed in claim 1, wherein said pedal bracket includes:

a head section having a supporting surface adapted to support a steering cowl;

an upper front arm section extended upwardly from said head section and secured to said front frame;

an upper rear arm section extended upwardly from said head section on the side of said supporting surface, and secured to said reinforce; and a foot section extended downwardly from said head section, and secured to said front mount rail, said foot section having:

a flat-plate-shaped surface section; and a flange section surrounding said flat-plate-shaped surface section, wherein said collision sensor is fixedly secured to said flat-plate-shaped surface section.

3. A pedal bracket for mounting a collision sensor to a vehicle comprising:

a head section having a supporting surface adapted to supporting a steering cowl;

an upper front arm section extended upwardly from said head section and secured to said front frame;

an upper rear arm section extended upwardly from said head section on the side of said supporting surface, and secured to said reinforce; and a foot section extended downwardly from said head section, and secured to said front mount rail, said foot section having:

a flat-plate-shaped surface section; and a flange section surrounding said flat-plate-shaped surface section, wherein said collision sensor is fixedly secured to said flat-plate-shaped surface section.

* * * * *